United States Patent [19]

Arai

[11] Patent Number: 4,816,204

[45] Date of Patent: Mar. 28, 1989

[54] METHOD FOR PRODUCING PLASTIC CARTRIDGE FOR SEALANTS

[75] Inventor: Ichiro Arai, Kanazawa, Japan

[73] Assignee: Toray Silicone Co., Ltd., Tokyo, Japan

[21] Appl. No.: 934,052

[22] Filed: Nov. 24, 1986

[51] Int. Cl.⁴ ............................................. B29C 49/04
[52] U.S. Cl. ................................... 264/541; 264/219; 264/540
[58] Field of Search ...................... 264/540, 541, 219; 425/532; 222/325

[56] References Cited

U.S. PATENT DOCUMENTS 4,176,413 12/1979 Whitney et al. .................... 264/541
4,246,227 1/1981 Crosby et al. ...................... 264/541

FOREIGN PATENT DOCUMENTS 2019952 12/1979 United Kingdom ................ 222/325

Primary Examiner—Jan H. Silbaugh
Assistant Examiner—Neil M. McCarthy
Attorney, Agent, or Firm—Roger H. Borrousch

[57] ABSTRACT

Plastic cartridge for packaging sealants is made by blow molding an extruded parison into a metal mold with a cavity whose interior diameter gradually increases toward the bottom in correspondence with the variation in thickness between the top and bottom of the parison, which variation in thickness results from longitudinal stretching of the extruded parison under its own weight. A plastic cartridge having equal inside top and bottom diameters is produced.

1 Claim, 2 Drawing Sheets

METHOD FOR PRODUCING PLASTIC
CARTRIDGE FOR SEALANTS

BACKGROUND OF THE INVENTION

1. Field of the Invention

The present invention relates to plastic cartridges which are to be filled with sealant, for example, sealants for sealing joints in civil engineering and construction applications. The cartridge is the type in which a plunger is inserted into one end in order to extrude the sealant.

2. Prior Art

Cartridges of the type under consideration have previously been produced by extruding a parison into a metal mold whose mold cavity has the same diameter at the top and bottom. This is then formed by blow-molding into a cylinder in conformity with said cavity. Cylinders of this type are preferably produced by blow-molding due to the simplicity of manufacturing.

PROBLEM TO BE SOLVED BY THE INVENTION

When the parison is extruded from the die, it longitudinally stretches under its own weight. At this point, so-called drawdown occurs and a cylindrical parison is formed in which the thickness increses toward the bottom. When such a cylindrical parison is blow-molded by complete inflation in a metal mold cavity with the same diameter at the top and bottom, the wall thickness of the produced cylinder naturally increases toward the bottom and the inside diameter of the cylinder will then decline toward the bottom. Because this cylinder becomes the cartridge, the inside diameter of the cartridge will decline toward the bottom.

While the sealant-extrusion plunger will seal with part of the interior surface of the cartridge, a gap will otherwise be generated over a major fraction of the surface. Sealant will then leak out through the gap or will be exposed to air and will cure or otherwise deteriorate. Prevention of this problem has required a very complicated means in which a special sealing device is installed on the outer circumference of the plunger.

BRIEF DESCRIPTION OF THE DRAWINGS

Similarly.

Figure 1:
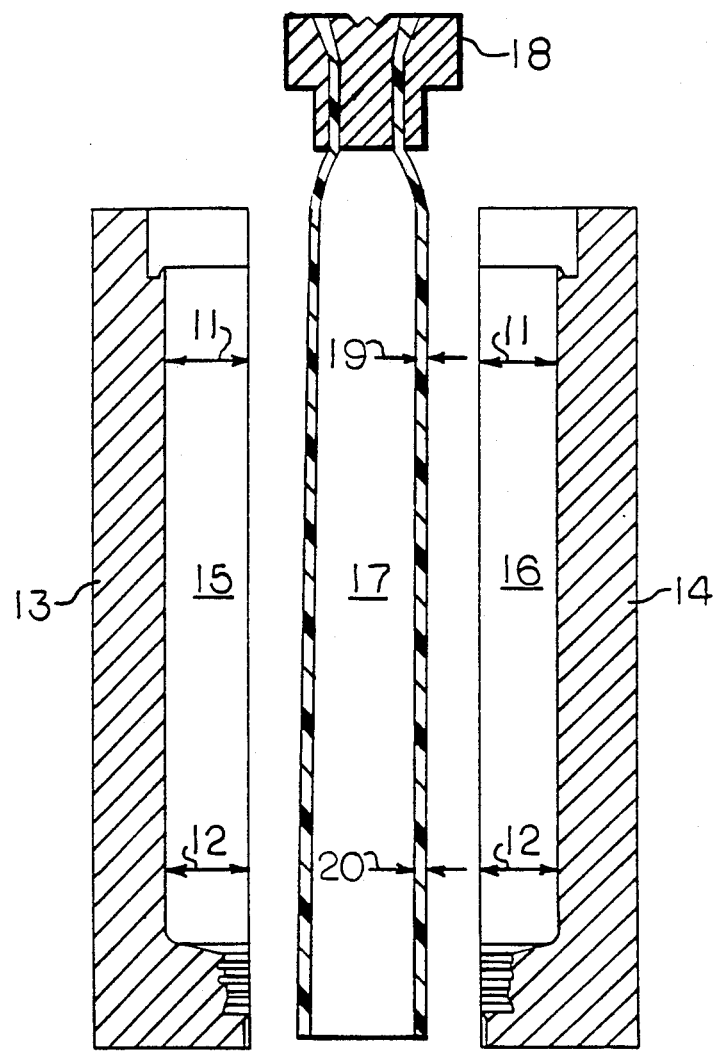
FIG. 1 is a longitudinal cross section of the first step in the production process of the cartridge of the invention.

In the figures, the same key applies to identical or equivalent elements.
11 - one half of the inside diameter of the top of the metal mold cavity
12 - one half of the inside diameter of the bottom of the metal mold cavity
13, 14 - matched metal molds
15, 16 - cavities in the matched metal molds
17 - parison
18 - die
19 - thickness at the top of the hanging parison
20 - thickness at the bottom of the hanging parison
31 - inside diameter of the top of the metal mold cavity
32 - inside diameter of the bottom of the metal mold cavity
33 - inside diameter of the top of the cartridge
34 - inside diameter of the bottom of the cartridge
35 - air nozzle
36 - cartridge
37 - sealant-extrusion opening
41 - thickness in the top and thinner region of the cartridge
42 - thickness in the bottom and thicker region of the cartridge
43 - closed-off tip of threaded sealant-extrusion opening
44 - sealant-discharge nozzle
45 - plunger

SUMMARY OF THE INVENTION

This invention relates to a method for making a plastic cartridge for sealants in which the inside diameters at the top and bottom are approximately equal, comprising extruding a cylindrical parison into a metal mold with a cavity whose interior diameter gradually increases toward the bottom in correspondence with the variation in thickness between the top and bottom of the parison, followed by fully inflating and forming the extruded parison within said mold cavity of the metal mold by blow-molding.

DESCRIPTION OF THE PREFERRED EMBODIMENTS

In the present invention, air is blown into a cylindrical plastic parison whose thickness increases toward the bottom and the parison is uniformly inflated at the top and bottom. At this point, the thicknesses of the cylindrical parison at the top and bottom retain this differential: the top is thinner and the thickness increases toward the bottom. However, the cartridge is blow-molded using a metal mold whose cavity gradually increases from the inside diameter at the top 31 to the inside diameter at the bottom 32, in correspondence to said thickness variation.

A carriage molded as above will have inside diameters at the top and bottom which are more or less equal, although the outside diameters at the top and bottom will differ due to the thickness variation. Accordingly, the plunger will function smoothly even when no particular measures have been implemented on the inserted plunger.

The invention will be explained with reference to the drawings. The inside diameter at the top 31 of the cavity (formed by the union of cavities 15 and 16 of matched metal molds 13 and 14) corresponds to the diameter of the outer circumference at the top of the cylinder obtained by blow-molding the parison 17. The inside diameter at the bottom 32 corresponds to the diameter of the outer circumference at the bottom of the cylinder obtained by blow-molding the parison 17. The parison is extruded from die 18 and is designed to rest in said metal mold cavity. The parison is then blow-molded and fully inflated in the cavity. As described above, the parison extruded from die 18 undergoes drawdown and the parison becomes thinner near the die in direct proportion to the downward elongation. When this parison is blow-molded by the present method, 31 is to be less than 32, and the outside diameter of the cartridge at the top becomes 31 and the outside diameter of the cartridge at the bottom becomes 32. The parison thickness is 19 at the top and 20 at the bottom and 19<20. At this point, the outward expansion at the bottom of the cavity is to be (20−19)×2 larger than at the top. Due to this arrangement of the metal mold cavity, the inside diameters at the top and bottom of the completed cartridge will be more or less equal: 33 is approximately equal to 34, where 33 is the inside diameter at the top of the cartridge 36 and 34 is the inside diameter at the bottom of the cartridge. Plastic cartridges for sealants can be manufactured by this method.

Figure 2:
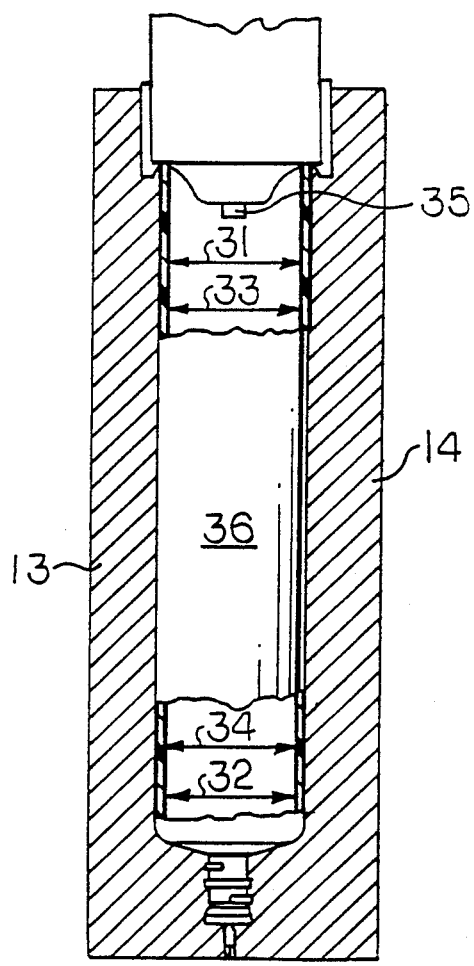
FIG. 2 is a partial longitudinal cross section of the second step.
Figure 3:
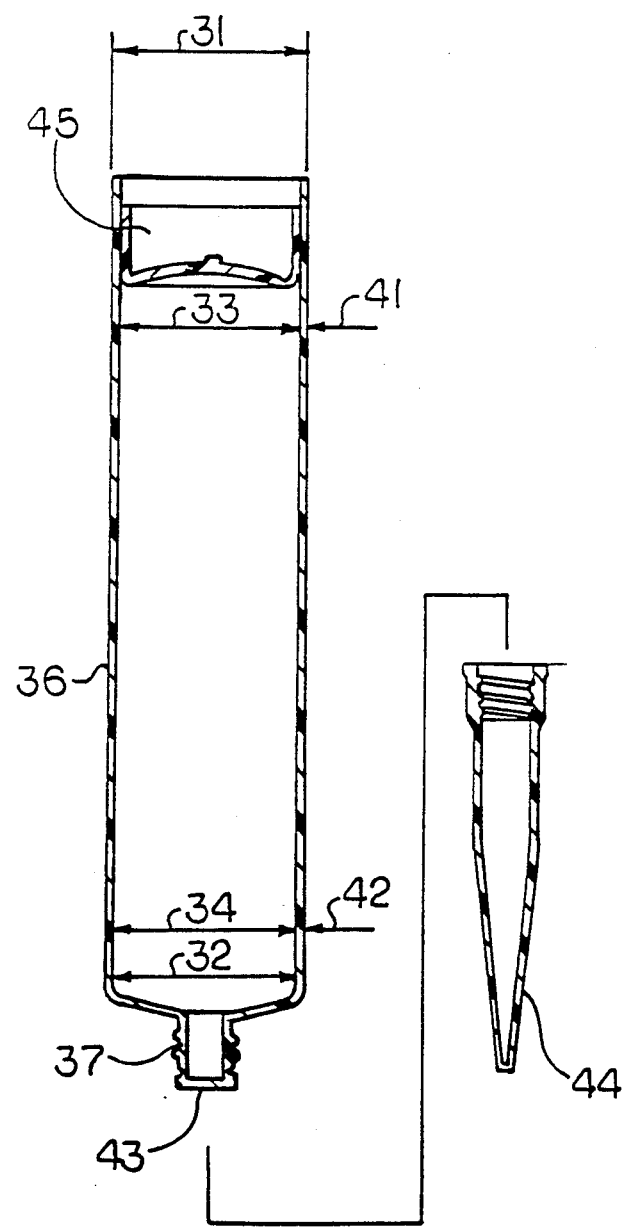
FIG. 3 is a longitudinal cross section of the stage in which the cartridge has been de-molded and the plunger inserted into the cartridge. The sealant-extrusion opening is closed. Also shown is the sealant-discharge nozzle.

In FIG. 1, matched metal molds 13 and 14 open on the left and right, respectively; cavities 15 and 16, which form the external shape of the cartridge, are provided in correspondence to the respective metal molds; and a tubular parison 17 is extruded from die 18 and hangs between the mold cavities. This parison is clamped between matched metal molds 13 and 14 and air is then blown into the parison from air nozzle 35, as shown in FIG. 2. The outer surface of the parison is fully inflated within the metal mold cavity by so-called blow molding, ultimately giving cartridge 36. FIG. 3 shows the cross section of a cartridge 36 molded from a parison as above, along with the cross sections of the sealant-extrusion opening 37 (the tip is generally closed off 43 and is removed at the time of use) and of a sealant-discharge nozzle 44 which may be fixed on the sealant-extrusion opening 37. Furthermore, FIG. 3 also shows a sealant-extrusion plunger 45 inserted into the cartridge from the open top.

Figure 4:
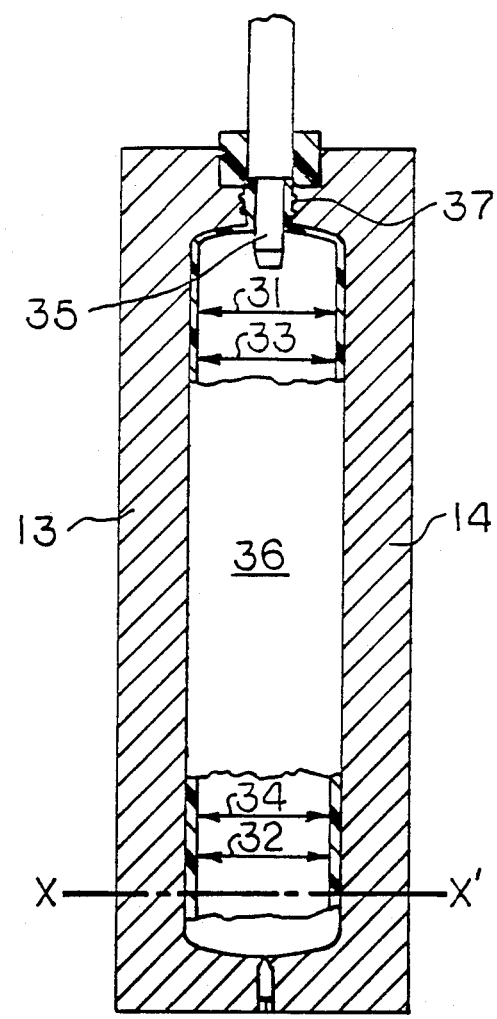
FIG. 4 shows another example of the configuration of the blow-molded cartridge in the metal mold.

Another example appears in FIG. 4. In this embodiment, the cartridge is blow-molded from the nozzle end rather than the plunger end as in FIGS. 1–3. Here, the extrusion opening 37 appears at the thin-walled, closed-off end and the air nozzle 35 for blow molding is inserted through this to provide the air blast for cartridge formation by full inflation within the metal mold cavity. The demolded cartridge 36 is cut along plane X—X′ and sealant is filled into the interior from this opening, through which the plunger 45 may also be inserted.

Effects of the Invention

When the parison is extruded from the die, a difference in thickness between top and bottom is necessarily generated as described previously, that is, the top is thinner and the bottom is thicker. In the case of prior plastic cartridges, the cartridge is molded in a metal mold in which the cavity has the same diameter at the top and bottom, and the inside diameter at one end of the cartridge is then less than the inside diameter at the other end of the cartridge. Accordingly, when a plunger adapted to the smaller diameter is inserted into the cartridge, a gap will appear between the plunger's outer circumference and the cartridge's inner surface in the region of the larger diameter. Sealant leaks out and is also exposed to the atmosphere and cures or otherwise deteriorates. Because the plastic cartridges made by the method of this invention are particularly suitable for packaging sealants which cure upon exposure to atmospheric moisture, the plunger needs to form a substantially airtight seal and still function as a plunger in forcing the sealant from the cartridge.

The present invention provides almost uniform top and bottom inside diameters in the cartridge by the application of a very simple means: in the metal mold cavity, the site corresponding to the thicker region of the parison is expanded outward, in correspondence to the thickness variation, relative to the site corresponding to the thinner region of the parison. Thus, 33 will be approximately equal to 34. Accordingly, there is no risk of sealant leakage or exposure to the air, without the necessity for using the prior highly elastic or highly specialized sealing means on the outer circumference of the plunger. An extremely economical plastic cartridge is thus obtained.

That which is claimed is:
1. A method for making a hollow, cylindrical plastic cartridge for sealants in which the inside diameters at the top and bottom of the cartridge are approximately equal to ensure proper sealing between a sealant-extrusion plunger and an interior surface of said cartridge which proper sealing will prevent sealant from leaking between said plunger and said interior surface of said cartridge during dispensing of said sealant from said cartridge, comprising extruding a hollow, cylindrical parison into a metal mold cavity such that said parison is formed having a wall thickness which gradually increases toward a first-extruded end of said parison due to longitudinal stretching of said parison under its own weight; designing said metal mold cavity to have an interior diameter which gradually increases toward a bottom thereof in accordance with said increasing wall thickness of said parison such that upon inflating and forming said parison without said mold cavity, said parison forms said plastic cartridge having an approximately equal inside diameter at the top and bottom of said cartridge resulting from thicker portions of said parison being blown to a greater extent relative to thinner portions of said parison, and inflating and forming said parison within said mold cavity to make said hollow, cylindrical plastic cartridge.

* * * * *